June 22, 1954  J. L. TABER  2,681,790
FLUID-ACTUATED JACK FOR AUTOMOTIVE VEHICLES
Filed March 5, 1951  3 Sheets-Sheet 1

Julius L. Taber
INVENTOR.

BY *Clarence A. O'Brien
and Harvey B. Jacobson*
Attorneys

June 22, 1954  J. L. TABER  2,681,790
FLUID-ACTUATED JACK FOR AUTOMOTIVE VEHICLES
Filed March 5, 1951  3 Sheets-Sheet 2
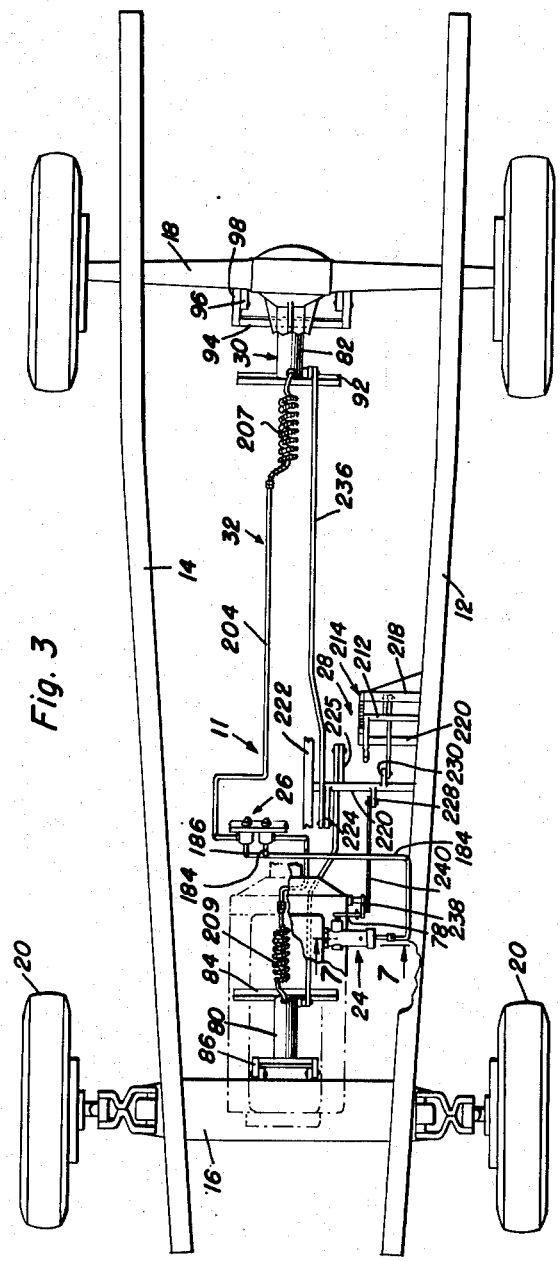
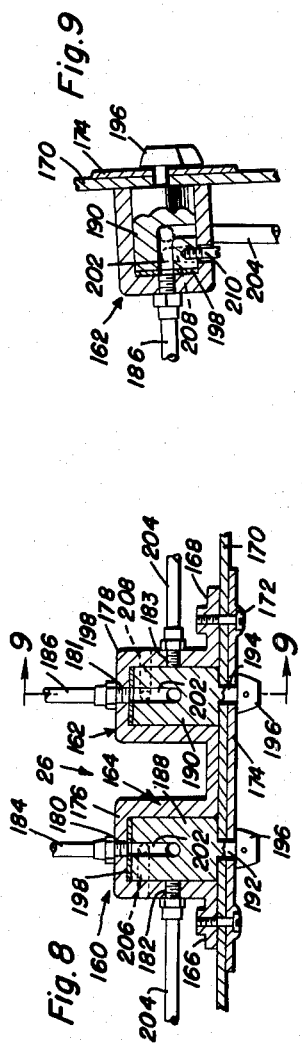
Julius L. Taber
INVENTOR.
BY
*Attorneys*

June 22, 1954   J. L. TABER   2,681,790
FLUID-ACTUATED JACK FOR AUTOMOTIVE VEHICLES
Filed March 5, 1951   3 Sheets-Sheet 3

Julius L. Taber
   INVENTOR.
BY
   Attorneys

Patented June 22, 1954

2,681,790

UNITED STATES PATENT OFFICE 2,681,790

FLUID-ACTUATED JACK FOR AUTOMOTIVE VEHICLES

Julius L. Taber, Los Angeles, Calif., assignor of twenty per cent to Meryle J. Taber and twenty per cent to William N. Taber, both of Los Angeles, Calif.

Application March 5, 1951, Serial No. 213,874

2 Claims. (Cl. 254—86)

The present invention relates to improvements in automobile jacks, and more particularly to an automobile jack arrangement which is adapted to be fixedly mounted on a vehicle as a permanent fixture thereof and wherein the jacks are associated with the forward and rear axles of the vehicle and actuated by the internal combustion of the vehicle to raise and lower the vehicle or forward and rear portions thereof.

An object of the present invention is to provide an automotive vehicle with fluid-actuated jacks on its forward and rear axles with lever and linkage means interconnected therewith whereby the jacks can be selectively pivoted from a retracted position to a ground-engageable position, whereupon actuation of the fluid-actuated jacks will raise or lower the vehicle or portions thereof.

Another object of the present invention resides in the manner in which the jacks are actuated, that being by pressure supplied from a pump actuated by the internal combustion engine of the vehicle, conduit means interconnecting the pump means with the fluid-actuated jacks for supplying the pressure thereto.

Still another object of the present invention resides in the provision of valves in the conduit means whereby the fluid-actuated jacks on the front and rear axles of the vehicle can be selectively actuated or simultaneously actuated, depending upon whether the entire vehicle or just an end portion thereof is to be raised.

A further object of the present invention resides in the novel construction of the pump means which is associated with the compression head of an internal combustion engine, whereby, while the engine is running, the piston of the pump means will be reciprocated simultaneously with the piston of the internal combustion engine, thereby to provide pressure to conduit means leading from the pump means.

A further object of the present invention resides in the novel linkage and lever arrangement whereby the various elements of the combination of the invention are simultaneously actuated to pivot the fluid-actuated jacks to their ground-engageable positions, initiate pump action in the pump means, open the valve in the base of the fluid-actuated jacks and to reverse the various operating steps.

Various other objects and advantages will become apparent from the detailed description to follow. The best form in which I have contemplated applying my invention is clearly illustrated in the accompanying drawings, wherein:

Figure 3 is a top plan view of the chassis of the motor vehicle shown in Figures 1 and 2;

Figure 8 is a horizontal longitudinal sectional view taken substantially along the plane of line 8—8 of Figure 1; and Figure 9 is a vertical sectional view taken substantially along the plane of line 9—9 of Figure 8.

Figure 1:
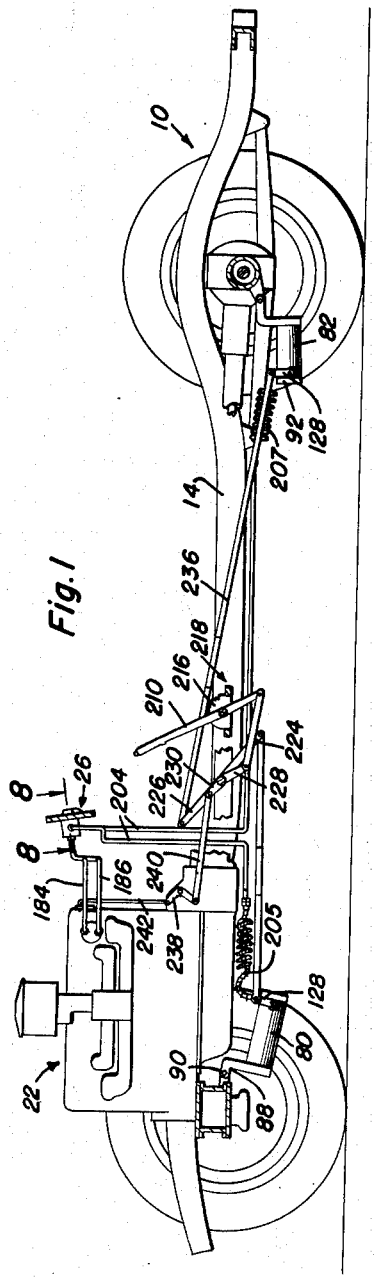
Figure 1 is a side elevational view of the structural combination of the present invention shown mounted on an automotive vehicle having an internal combustion engine and wherein the fluid actuated jacks are in their retracted positions.

Referring more particularly to the drawings wherein like numerals designate like parts throughout, the numeral 10 designates generally the conventional chassis of an automotive vehicle comprised of frame elements 12 and 14, forward and rear axle housings 16 and 18, wheels 20, and an internal combustion engine 22. The fluid-actuated jack apparatus which is to be fixedly secured to the chassis 10 of a conventional automotive vehicle is designated generally by the numeral 11 and is comprised of a pump means 24, valve means 26, lever and linkage arrangement 28, fluid-actuated jack means 30 and conduit means 32.

Figure 2:
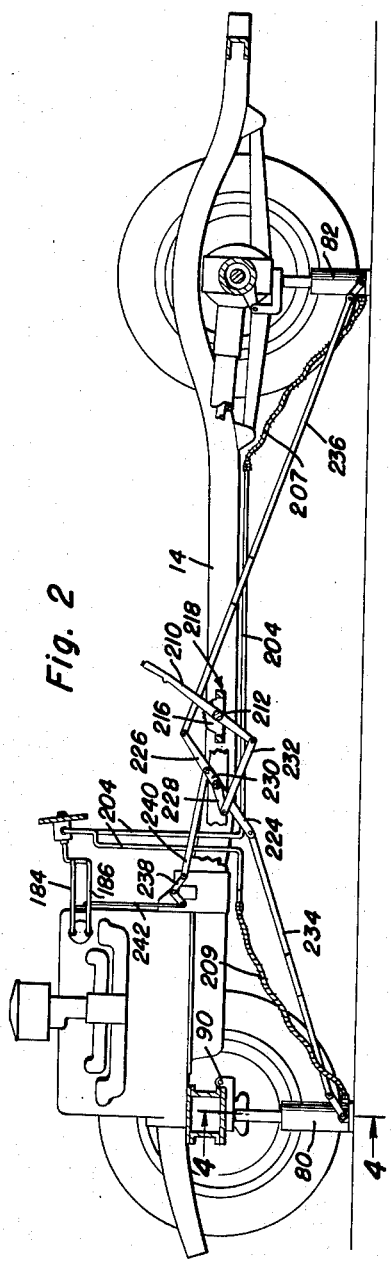
Figure 2 is a view similar to Figure 1 but wherein the fluid-actuated jacks are in their extended positions for raising the vehicle with respect to a supporting surface.
Figure 7:
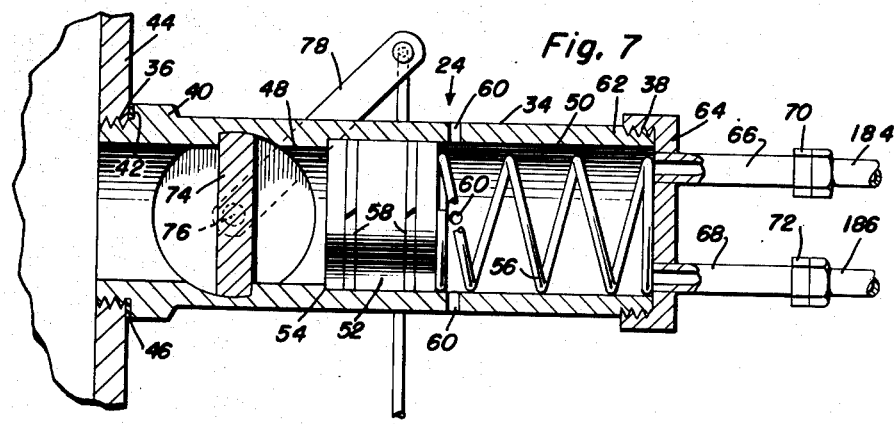
Figure 7 is a vertical transverse sectional view taken substantially along the plane of line 7—7 of Figure 3.

The pump means 24 is shown in assembled relation with the internal combustion engine 22 in Figures 1 through 3 and the details of the pump means are shown in the sectional view of Figure 7. The pump means 24 is comprised of a substantially cylindrical and elongated housing 34 which is of a diameter approximating that of a spark plug, the ends of the housing 34 being externally threaded at 36 and 38. The first end 40 of the housing 34 has a shoulder 42 which is adapted to abut the compression head 44 with the threaded portion 36 threadably engaged in a tapped hole in the compression head 44, the tapped hole communicating with a compression chamber of the head. A sealing element 46 is interposed between the shoulder 42 and the compression head 44 in order that compression will not be lost through the joint between the housing 34 and the head 44. The housing 34 is formed with a first bore 48 and a second bore 50 with a piston 52 slidably mounted in the second bore 50 and adapted to abut the shoulder 54 formed between the two bores 48 and 50 in response to the urgings of the compression spring 56. The piston 52 has a pair of piston and sealing rings 58 engaged thereon for sealing engagement with the walls of a bore 50. The cylindrical housing 34 is also formed with a plurality of apertures 60 which constitute inlets whereby fresh air can be admitted into the bore 50 on the right-hand side of the piston 52.

The end 62 of the housing 34 has a cap 64 threadably engaged on the threaded portion 38 and has a pair of conduit sections 66 and 68 extending therefrom and terminating in connectors 70 and 72 for connection to the conduit means 32, as will be hereinafter more fully disclosed.

Rotatably mounted within the first bore 48 of the housing 34 is a disk valve 74 which is fixedly secured to a pin 76 rotatably journaled in the walls of the housing 34 whereby the disk valve 74 can be rotated in response to rotation of the linkage element 78 as will be more fully described hereinafter.

With the engine 22 idling, and the valve 74 in open position, it will be seen that during the compression stroke of the piston of the internal combustion engine, the piston 52 of the pump means 24 will be moved to compress the spring 56, at the same time closing the apertures 60. Thus, fluid pressure will be delivered to the outlets 66 and 68. Upon suction stroke of the piston of the engine, the piston 52 will move to the left, thereby uncovering the aperture 60 and admitting fresh air to the bore 50 for the next stroke. In this manner, pump means 24 is simultaneously actuated upon operation of the internal combuston engine 22 and will provide fluid pressure to the conduit means 32 as desired.

The fluid-actuated jack means 30 is comprised of forward and rear jacks 80 and 82, as seen best in Figures 1 through 3. The forward jack 80 has an elongated base bar 84 secured thereto for ground engagement and has its upper end formed with a U-shaped bracket 86 having angulated ears 88 adapted to be fixedly secured to the front axle housing 16 by means of the pins 90.

The rear fluid-actuated jack 82 is similar to the forward jack 80, having the elongated base bar 92 secured to its bottom and having a U-shaped attaching bracket 94 secured to its upper end for interconnection with the ears 96 fixedly secured to the axle housing 18 by means of the pins 98.

Figure 4:
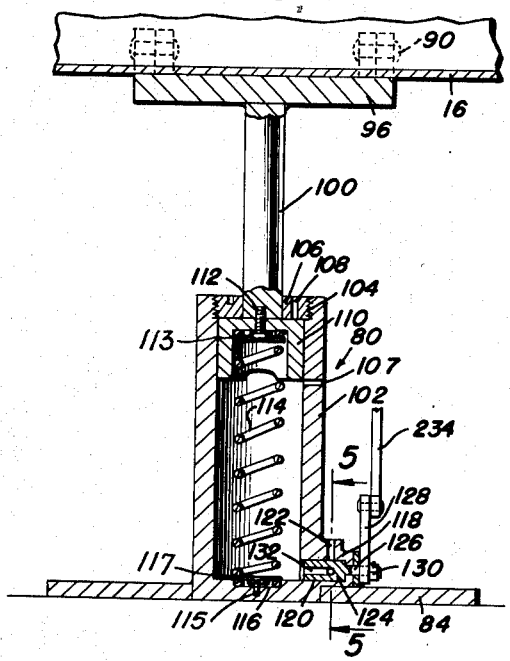
Figure 4 is a vertical transverse sectional view taken substantially along the plane of line 4—4 of Figure 2.
Figure 5:
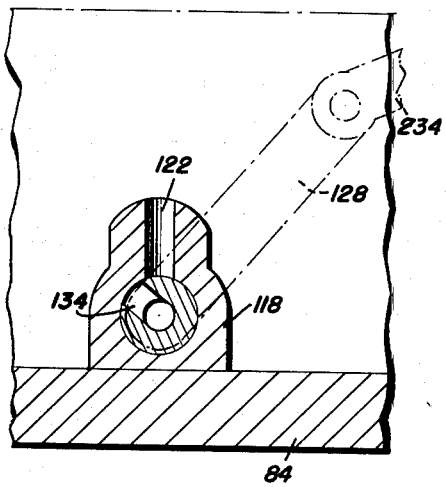
Figure 5 is a vertical transverse sectional view taken substantially along the plane of line 5—5 of Figure 4.
Figure 6:
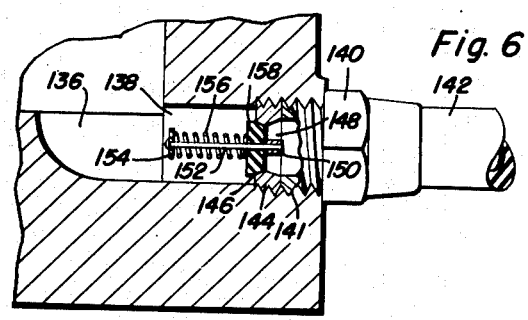
Figure 6 is a detail sectional view through the base of the fluid actuated jack of Figure 4 and showing the check valve mounted therein.

The detailed structure of the fluid-actuated jack 80 or 82 is shown best in Figures 4 through 6. The U-shaped attaching bracket 86, 94 in the rear fluid-actuated jack, is fixedly secured to the plunger 100 whereby the axle housing 16 will be upwardly moved with the plunger 100 upon actuation of the fluid-actuated jack 80. The jack 80 is comprised of a cylindrical housing 102 which has the base bar 84 fixedly secured to the bottom end thereof and has its upper open end 104 provided with a removable closure 106 which is threadably engaged therein. The closure 106 has an opening 108 therein whereby free communication between the interior of the housing 102 and the exterior of the housing can be maintained, except for that portion of the housing 102 which is below the piston 110. The housing is provided with an aperture at 107 whereby when the piston reaches its uppermost position, further pressure will be exhausted thru the aperture 107. The piston 110 is of cup-shaped form and is removably secured to the plunger 100 by means of the screw 112. A tension coil spring 114 is engaged in a recess 116 in the base of the housing 102 and has its upper end engaged in the recess of the cup-shaped piston 110 for normally urging the plunger 100 inwardly of the housing 102, the ends of the spring 114 being restrained by the screw 112 and the screw 115 removably carried by the base of the housing 102, the screws 112 and 115 carrying washers 113 and 117, respectively, which are engaged over end loops of the spring 114. Thus, the piston 110 and plunger 100 may be inwardly or outwardly urged, since there will be free communication between the upper end of the housing 102 and the atmosphere through the opening 108 in the closure 106.

Adjacent one side of the base of the housing 102 is an extension 118 formed with a first bore 120 and a radially extending bore 122 in communication with the first bore 120. A rotary valve plug 124 is rotatably disposed in the first bore 120 and has an extension portion 126 extending outwardly of the body portion 118, whereby the rotary plug valve 124 can be rotated in response to pivoting movement of the linkage element 128 which is fixedly secured to the extension 126 and retained thereon by means of the nut 130. The rotary plug valve 124 has a longitudinal bore 132 for communication with the interior of the housing 102 and has a radial bore 134 in open communication with the bore 132 adapted to be selectively in communication with the bore 122 upon rotation of the plug valve 124 in response to pivoting of the linkage element 128. It will therefore be seen that when the rotary plug valve 124 is pivoted in response to actuation by the linkage means 28, the bore 122 being in open communication with the atmosphere, any pressure trapped within the housing 102 will be exhausted, thereby allowing the vehicle to be lowered.

Looking now at Figure 6, the inlet for the housing 102 will be seen to comprise a passage 136 opening into the base of the bore of the housing 102 and communicated with the laterally extending bore 138. A connector 140 is threadably engaged within the bore 138 for interconnecting the supply conduit 142 with the bore 138. A valve seat element 144 is threadably engaged within the threaded portion 141 and has a tapered seat 146 on one face with spider elements 148 supporting the bearing element 150 at the center of the seat 144. A pin 152 is engaged in the bearing 150 for support thereby and has its other end provided with a spring retainer 154 whereby the coil spring 156 can be engaged against the back side of the valve 158 for normally urging the same in engagement with the valve seat 146. Thus, the fluid pressure delivered from the inlet conduit 142 can pass the check valve 158 into the bore of the housing 102, return of the pressure being prevented by the check valve 158.

The details of the valve means 26 are best shown in Figures 8 and 9. The valve means 26 is comprised of a pair of valves 160 and 162 which are enclosed in a unitary housing 164 having flange portions 166 and 168 secured to the instrument panel 170 of the vehicle by means of the screws 172, an indicator panel 174 being retained by the screws 172 on the panel 170 for indicating open and closed positions.

The valve housing 164 is formed with a pair of cylindrical recessed portions 176 and 178, each being formed with an opening 180 or 181 in its bottom wall and formed with radial openings 182 and 183 in the side walls of the cylindrical portions. Inlet conduit sections 184 and 186 are interconnected in the openings 180 and 181 for supplying fluid pressure to the housing portions 176 and 178. Rotatable valve plugs 188 and 190 are rotatably disposed within the recessed portions 176 and 178 of the housing 164 and have extension portions 192 and 194 extending through the instrument panel 170 and provided with knobs 196 for rotating the valves 188 and 190. Each of the cylindrical housing portions 176 and 178 is provided with a sealing disk 198 for positioning between the housing 164 and one face of each of the valve plugs 188 and 190.

The valve plugs 188 and 190 are formed with bell-shaped bores 200 and 202 whereby communication between the openings 180 and 182, and 181 and 183 can be selectively effected upon rotation of the knobs 196. Each of the outlet openings 182 and 183 of the valves 160 and 162 has an outlet conduit section 204 connected thereto for delivery of the fluid pressure to the fluid actuated jacks 80 and 82.

The valve plugs 188 and 190 are formed with arcuate recesses 206 and 208 and a screw 210 is engaged through the wall of the housing 164 for engagement within the arcuate recesses 206 and 208 for limiting the rotating movement of the valve plugs 188 and 190.

As seen best in Figures 1 through 3, the conduit means 11 includes a pair of inlet conduit sections 184 and 186 which interconnect the outlet sections 66 and 68 of the pump means 24, as shown in Figure 7, with the valves 160 and 162 respectively. Each of the valves 160 and 162 has an outlet conduit section 204 which terminates adjacent the under side of the vehicle. Resilient conduit sections 205 and 207 are connected to the ends of the outlet conduit sections 204 and terminate in the portions 142 which are connected to the bases of the fluid actuated jacks 80 and 82. The resilient conduit sections 205 and 207 are formed with coil springs thereon, indicated by the numeral 209, whereby, when the jacks are in their retracted positions, the resilient conduit sections 205 and 207 will be coiled as shown in Figure 1.

The lever and linkage arrangement 28 is comprised of a manual lever 210 which is pivotally supported on the pin 212 rotatably carried by the frame element 12 and the bracket 214. The bracket 214 terminates at its inner end in an arcuated ratchet element 216 which can be conventionally employed for latching the lever 210 in preselected positions. The bracket 214 has a pair of struts 218 and 220 which are secured to the frame element 12 for supporting the ratchet element 216 in spaced parallel relation thereto.

A rod 220 is rotatably supported in spaced parallel relation to the pin 212 by means of the frame element 222 and the frame element 12. The rod 220 has a first lever 224, second lever 226, third lever 228 and fourth lever 230 fixedly secured thereto and extending laterally therefrom in various angular relations to each other. The lever 228 is interconnected with the lever 210 by means of the linkage element 232. The levers 224 and 226 are respectively interconnected with the fluid actuated jacks 80 and 82 by means of the linkages 234 and 236 which are respectively connected to the linkage elements 128 and 128' connected to the rotary plug valves of the jacks.

An L-shaped lever 238 is pivotally mounted on any convenient portion of the engine 22 and is interconnected with the lever 230 by means of the linkage 240, the other end of the lever 238 being interconnected by means of the linkage 242 to the lever 78 of the disk valve 74 in the pump means 24.

In view of the foregoing, it is believed that the construction and operation of the fluid actuated jack of the present invention will be readily understood by one skilled in the art. With the fluid actuated jacks 80 and 82 in their retracted positions as shown in Figure 1, the means of the present invention may be employed for raising either the forward or rear ends of the vehicle, or both ends of the vehicle as desired by pivoting the actuating lever 210 to the position shown in Figure 2. The pivoting of the various levers and their linkage means will effect pivoting of the jacks 80 and 82 to their ground-engageable positions. At the same time, the valve 74 in the pump means 24 will be rotated to its open position, thereby actuating the piston 52 for supplying fluid pressure to the conduit means. Assuming both of the valves 160 and 162 to be in open position, fluid pressure will be admitted past the check valve 158 and the plungers of each of the jacks will be moved outwardly for raising the vehicle with respect to a supporting surface. Of course, the linkage elements 234 and 236 will have rotated the rotary valves 124 in the bases of the jacks 80 and 82 to their closed position, whereby the fluid supplied to the jacks will be trapped therein. Should it be desired that one of the jacks be actuated, a preselected one of the valves 160 or 162 is opened whereby pressure is supplied to the preselected jack. With one of the valves closed, fluid pressure will be provided for a preselected one of the jacks for raising the portion of the vehicle to which the jack is attached.

When it is desired to lower the vehicle, the actuating lever 210 is given a slight jerking motion whereby the levers 128 attached to the valves 124 will be given a slight movement to thereby crack an opening between the bores 132 and 122, whereby communication between the interior of the housing 102 and the atmosphere can be accomplished for exhausting the fluid pressure therein and thereby permitting the piston 110 to initially move downwardly into the housing. As soon as the pressure in the housing 102 has been returned to that of the atmosphere and the housing 102 moved upwardly relative to the piston by the spring 114, the lever 210 is pivoted toward its extreme opposite position, whereby the jacks will be in their retracted positions.

If desired, the housings 102 of the jacks 80 and 82 can be supplied with conventional bleeder valves whereby, when the plungers 100 reach their extreme positions, the fluid pressure within the housings 102 will be limited and the engine 22 may be maintained in running position.

In view of the foregoing, it is believed that a device has been provided which will accomplish all of the objects hereinafter set forth.

Having described my invention, what is claimed as new is as follows:

1. A jack for vehicles having internal combustion engines comprising pump means mounted on the head of the internal combustion engine, fluid actuated jacks pivotally carried by the front and rear axles of the vehicle, conduit means interconnecting said pump means with said fluid actuated jacks for supplying fluid pressure to said jacks, valve means interposed in said conduit means for controlling the flow therethrough for selectively supplying and cutting off fluid pressure to said fluid actuated jacks, means interconnected with said forward and rear jacks for pivoting the same from their retracted position to ground-engageable positions, said last-named means including a lever and linkage arrangement and a valve on each of said jacks interconnected to said lever and linkage arrangement and actuated thereby simultaneously with pivoting movement of said jacks, said valve on each of said jacks controlling the flow of fluid into said jacks and being in open condition when the jacks are in their lowered positions and being closed when said jacks are in their retracted positions.

2. A jack for vehicles having internal combustion engines comprising pump means mounted on the head of the internal combustion engine, fluid actuated jacks pivotally carried by the front and rear axles of the vehicle, conduit means interconnecting said pump means with said fluid actuated jacks for supplying fluid pressure to said jacks, and valve means interposed in said conduit means for controlling the flow therethrough for selectively supplying and cutting off fluid pressure to said fluid actuated jacks, and means interconnected with said pump means and said forward and rear jacks for simultaneously rendering the pump operative and pivoting the jacks from their retracted positions to their ground-engaging positions whereby fluid pressure from said pump means can actuate said jacks for raising and lowering the vehicle, said last-named means including a lever and linkage arrangement, a valve on said pump means and a valve on each of said jacks interconnected to said lever and linkage arrangement and actuated thereby, said valve on said pump means rendering said pump means inoperative when in closed position, and said valve on each of said jacks controlling the flow of fluid into said jacks and being in open condition when the jacks are in their lowered positions and being closed when said jacks are in their retracted positions.

References Cited in the file of this patent
UNITED STATES PATENTS

| Number | Name | Date |
|---|---|---|
| 977,351 | Waterhouse | Nov. 29, 1910 |
| 2,038,485 | Geeck | Apr. 21, 1936 |
| 2,045,524 | Fehrmann | June 23, 1936 |
| 2,353,855 | Schwarz | July 18, 1944 |